No. 871,284.  
E. C. LOVELL.  
PACKING MACHINE.  
APPLICATION FILED AUG. 29, 1906.

PATENTED NOV. 19, 1907.

13 SHEETS—SHEET 1.

Fig. 1.

Witnesses:  
Harry Fleischer  
John O. Seifert.

Inventor:  
Edward Colston Lovell.  
By his Attorney,  
F. H. Richards.

No. 871,284.

PATENTED NOV. 19, 1907.

E. C. LOVELL.
PACKING MACHINE.
APPLICATION FILED AUG. 29, 1906.

13 SHEETS—SHEET 2.

Witnesses:
Harry Fleischer
John O. Seifert

Inventor:
Edward Colston Lovell.
By his Attorney,
F. H. Richards

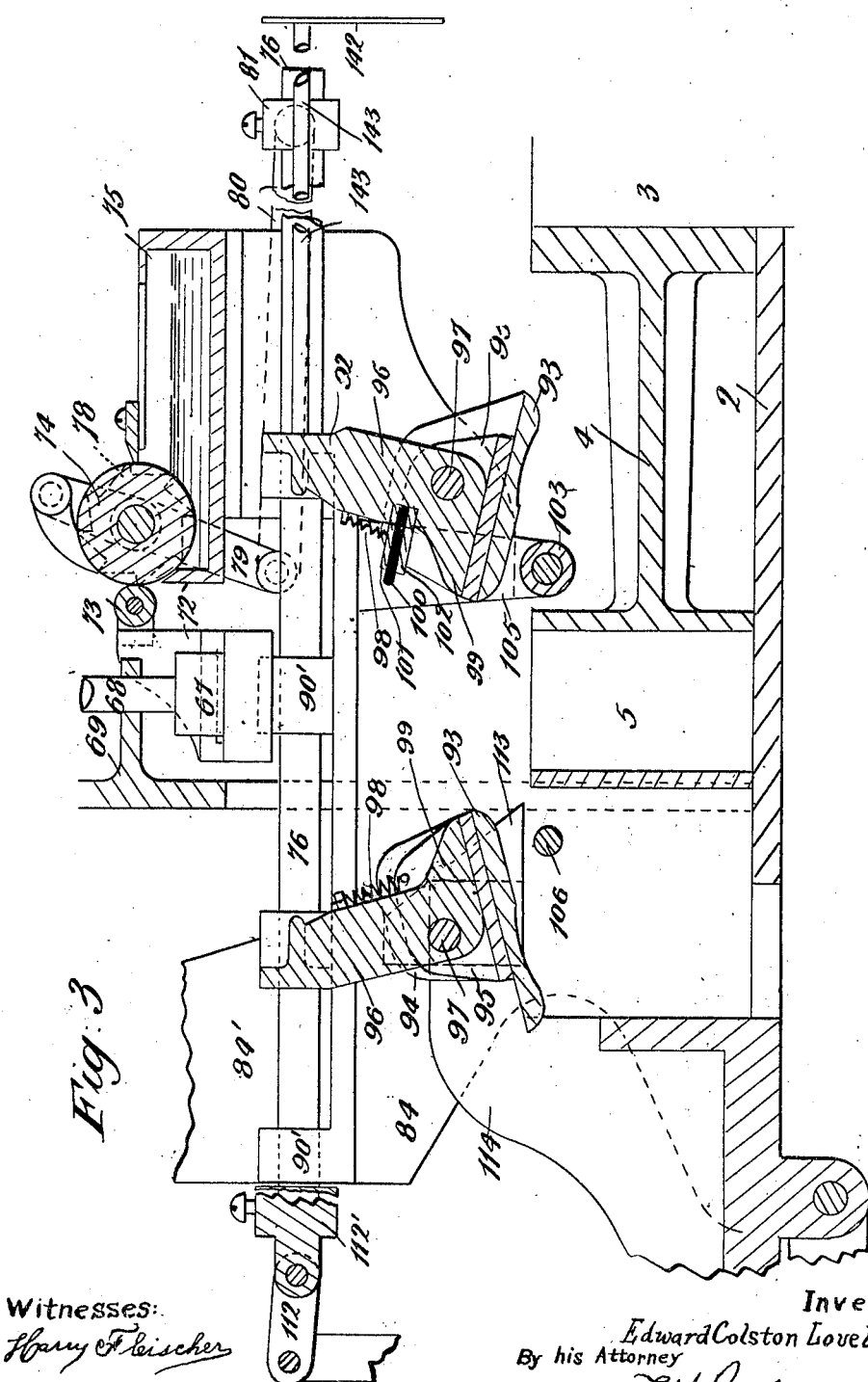

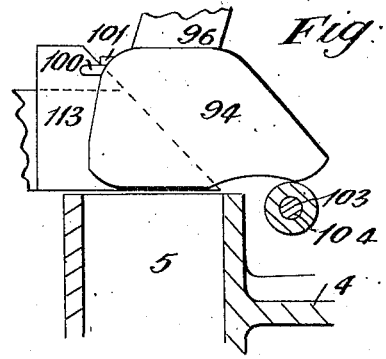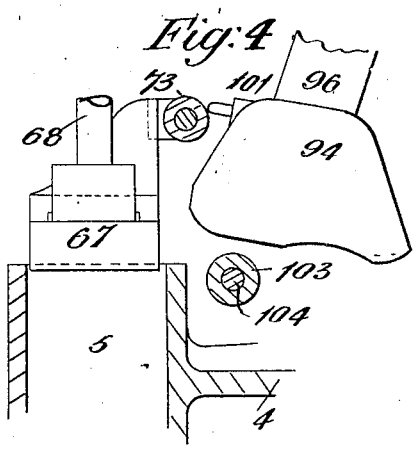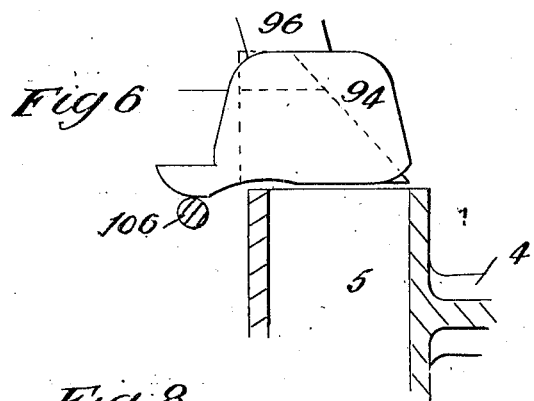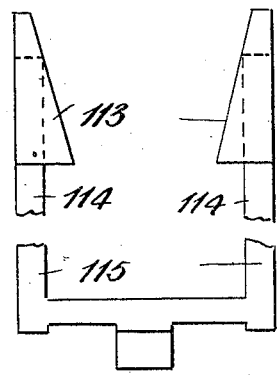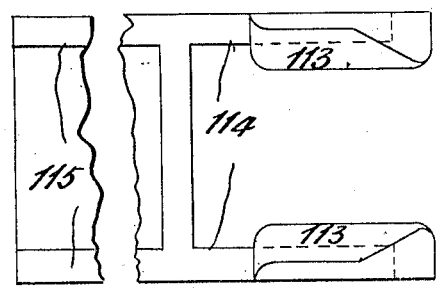

No. 871,284. PATENTED NOV. 19, 1907.
E. C. LOVELL.
PACKING MACHINE.
APPLICATION FILED AUG. 29, 1906.
13 SHEETS—SHEET 5.
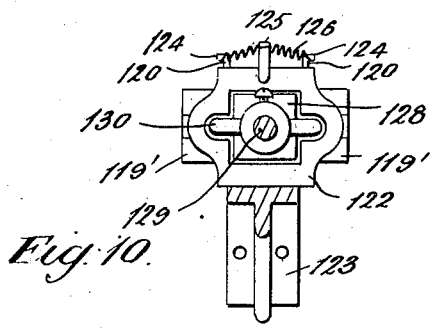
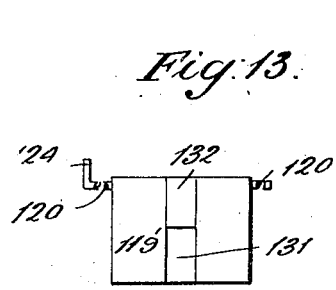
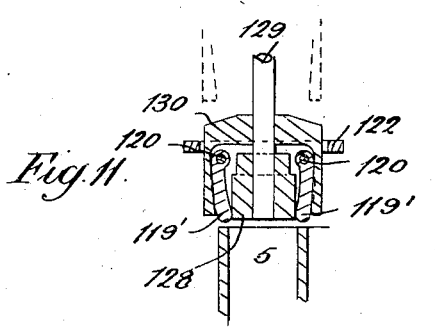
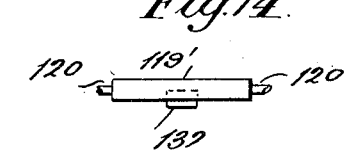
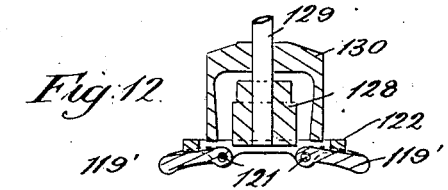
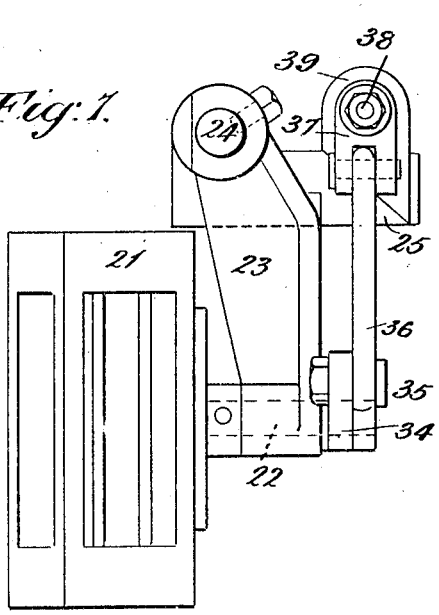
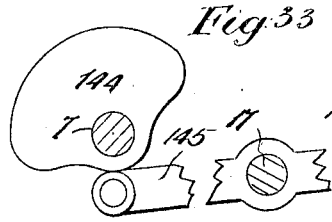
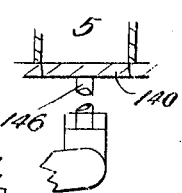
Witnesses:
Harry Fleischer
Robert Adt
Inventor:
Edward Colston Lovell.
By his Attorney,
F. H. Richards.

No. 871,284. PATENTED NOV. 19, 1907.
E. C. LOVELL.
PACKING MACHINE.
APPLICATION FILED AUG. 29, 1906.
13 SHEETS—SHEET 6.
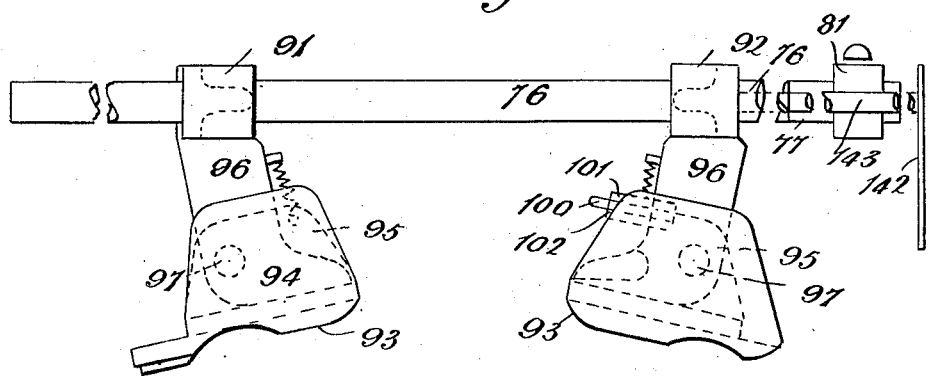
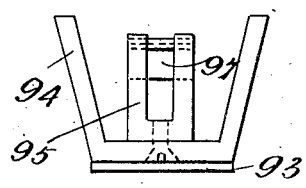
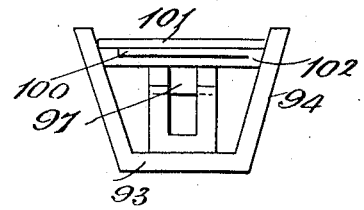
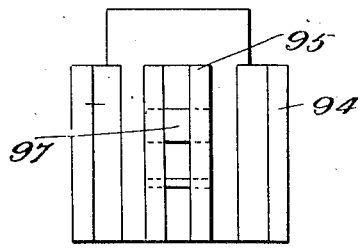
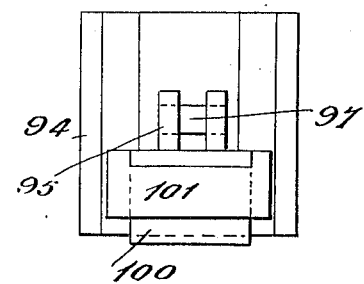
Witnesses:
Inventor:
Edward Colston Lovell.
By his Attorney

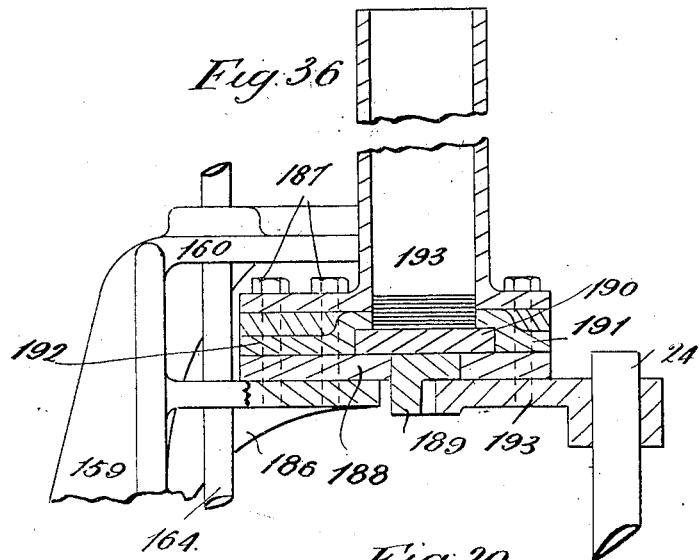
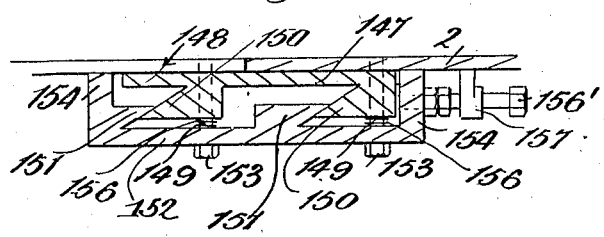
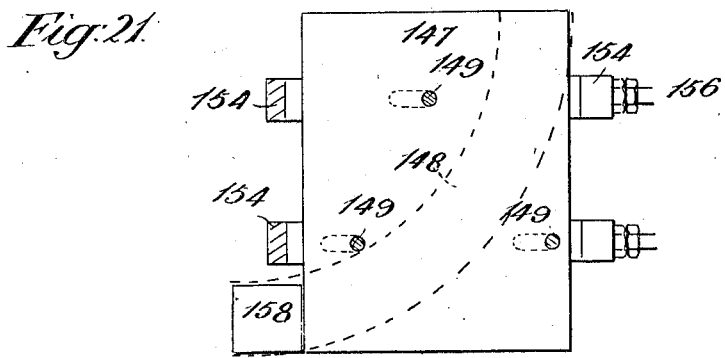

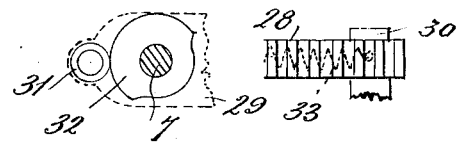
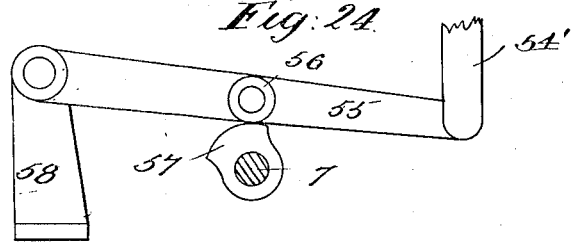
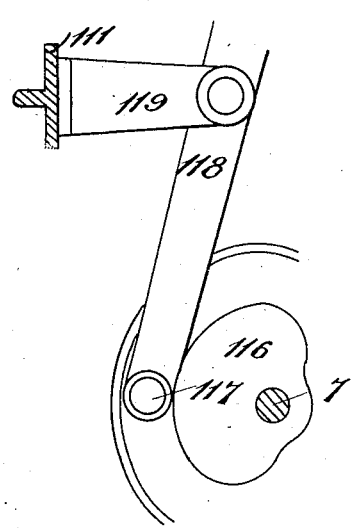
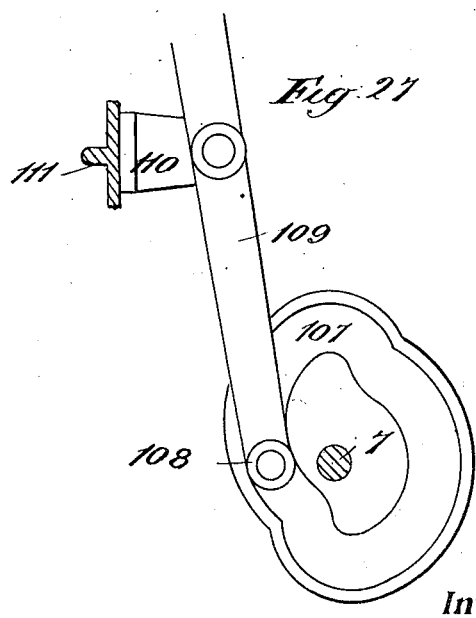

No. 871,284.
E. C. LOVELL.
PACKING MACHINE.
APPLICATION FILED AUG. 29, 1906.
PATENTED NOV. 19, 1907.
13 SHEETS—SHEET 10.
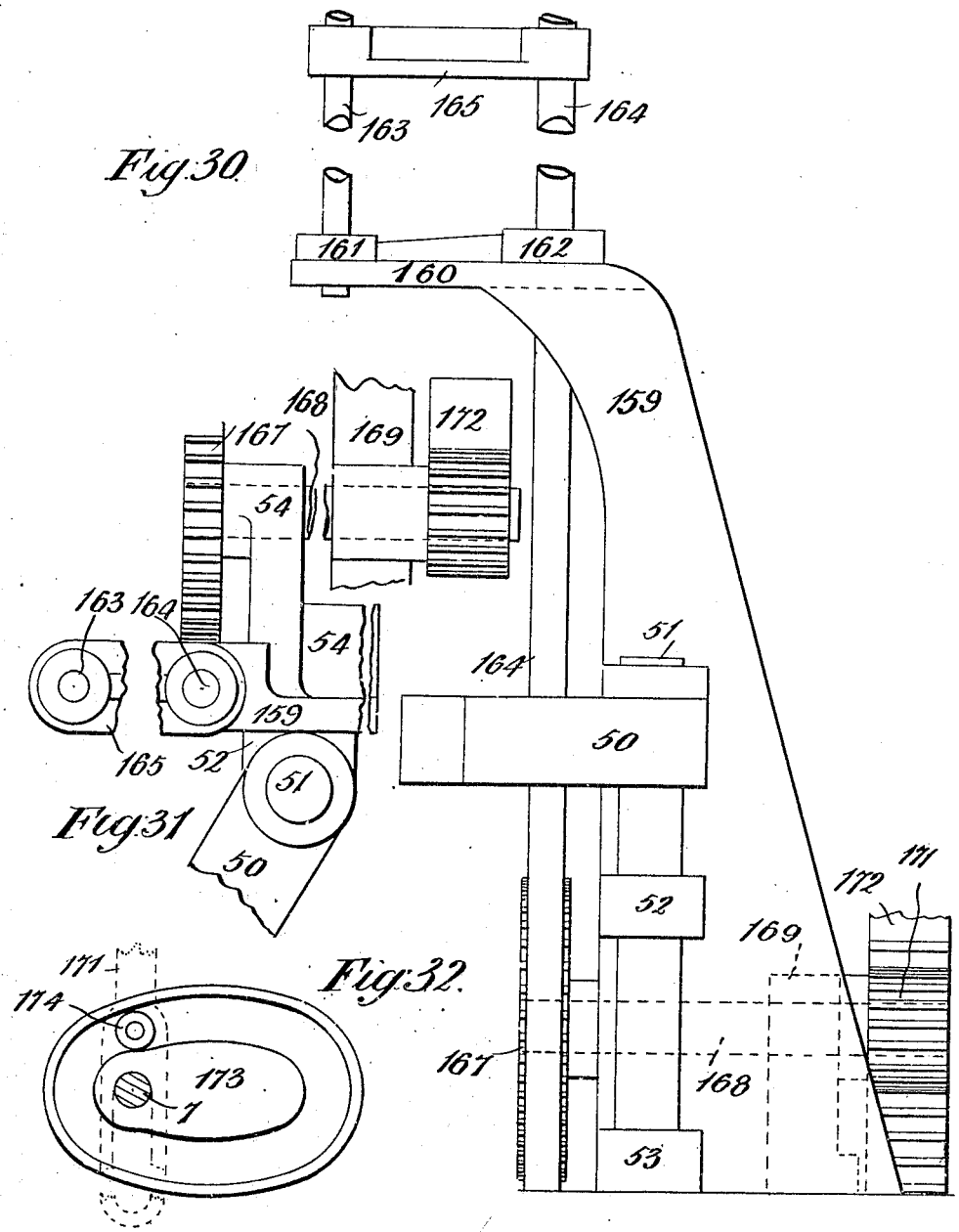
Witnesses:
Harry Fleischer
Robert Alt
Inventor:
Edward Colston Lovell.
By his Attorney,
F. H. Richards.

No. 871,284. PATENTED NOV. 19, 1907.
E. C. LOVELL.
PACKING MACHINE.
APPLICATION FILED AUG. 29, 1906.

13 SHEETS—SHEET 11.

Witnesses:
Harry Fleischer
Robert Ott

Inventor:
Edward Colston Lovell.
By his Attorney,
F. H. Richards.

No. 871,284. PATENTED NOV. 19, 1907.
E. C. LOVELL.
PACKING MACHINE.
APPLICATION FILED AUG. 29, 1906.

13 SHEETS—SHEET 12.

Witnesses
H. D. Penny
John O. Seifert

Inventor:
Edward Colston Lovell.
By his Attorney, F. H. Richards.

No. 871,284. PATENTED NOV. 19, 1907.
E. C. LOVELL.
PACKING MACHINE.
APPLICATION FILED AUG. 29, 1906.
13 SHEETS—SHEET 13.

Witnesses
H. D. Penney
John C. Seifert

Inventor:
Edward Colston Lovell.
By his Attorney, F. H. Richards.

UNITED STATES PATENT OFFICE.

EDWARD COLSTON LOVELL, OF BRISTOL, ENGLAND.

PACKING-MACHINE.

No. 871,284.  Specification of Letters Patent.  Patented Nov. 19, 1907.

Application filed August 29, 1906. Serial No. 332,425.

*To all whom it may concern:*

Be it known that I, EDWARD COLSTON LOVELL, a subject of the King of Great Britain, residing in Bristol, England, engineer, have invented certain new and useful Improvements in Packing-Machines, of which the following is a specification.

This invention relates to an improved packing machine and it has for its object to construct a machine for this purpose which may be arranged to act in conjunction with machines for forming bags or cases and mechanism for weighing the goods.

In order that the invention may be the better understood drawings are appended in which:—

Figure 2:
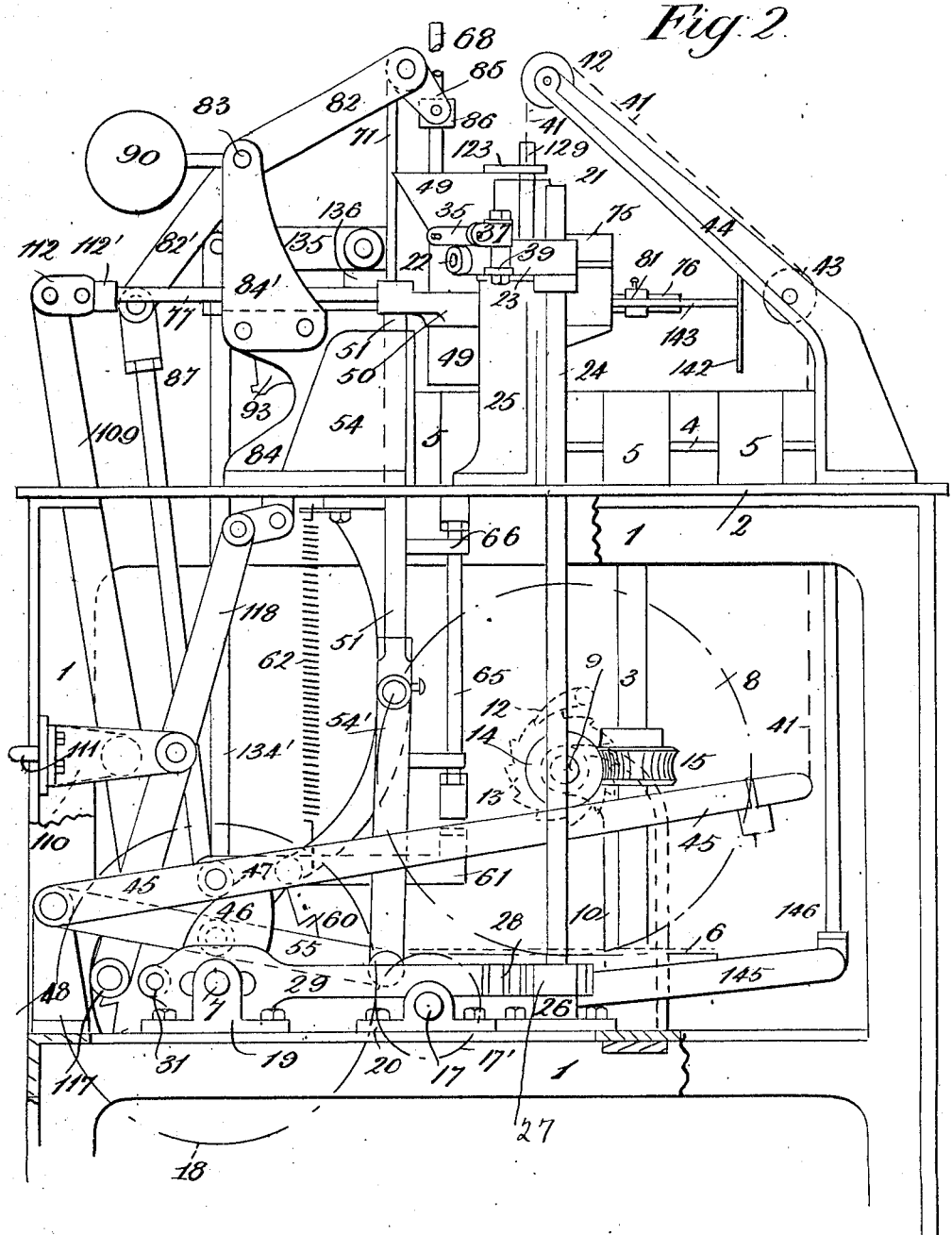
Figure 23:
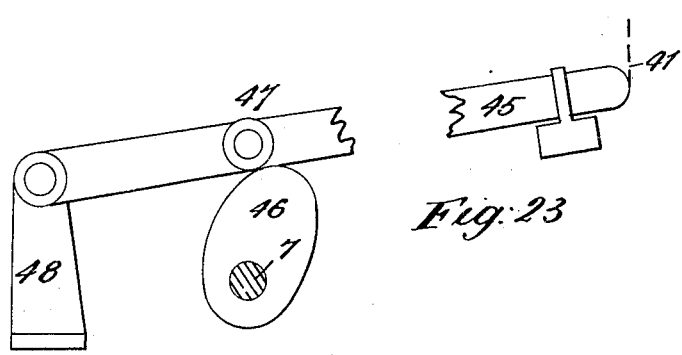
Figure 25:
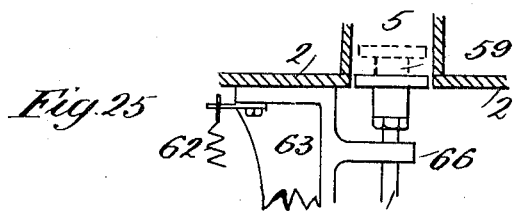
Figure 28:
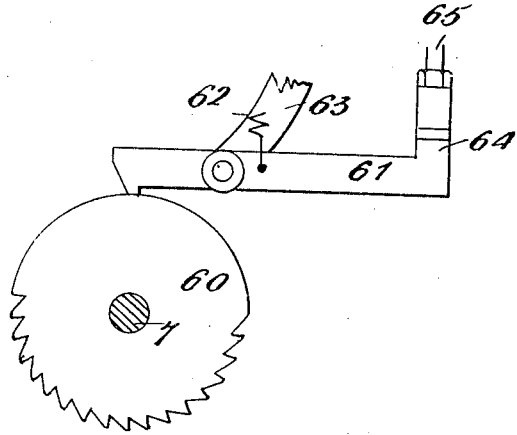
Figure 34:
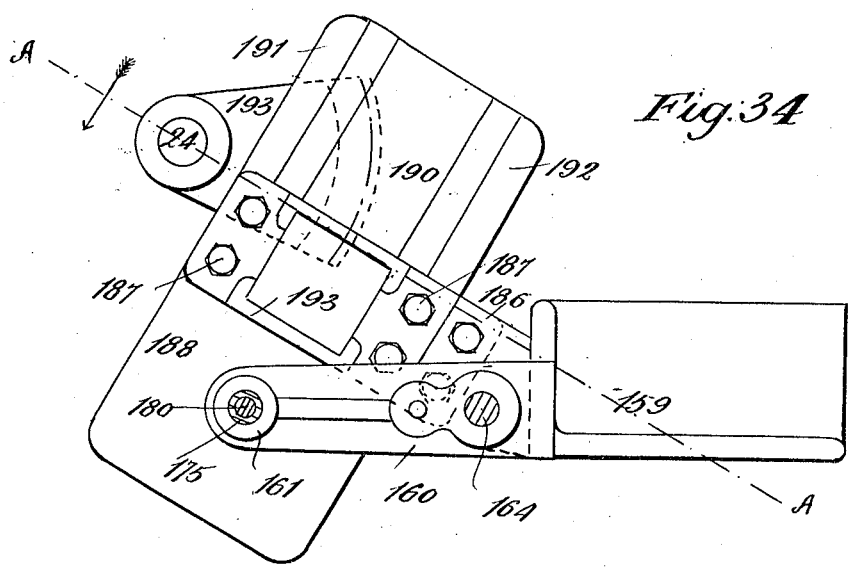
Figure 35:
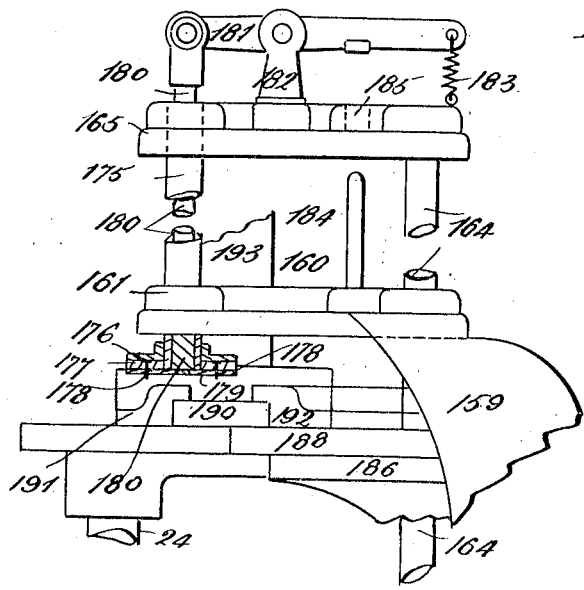
Figure 37:
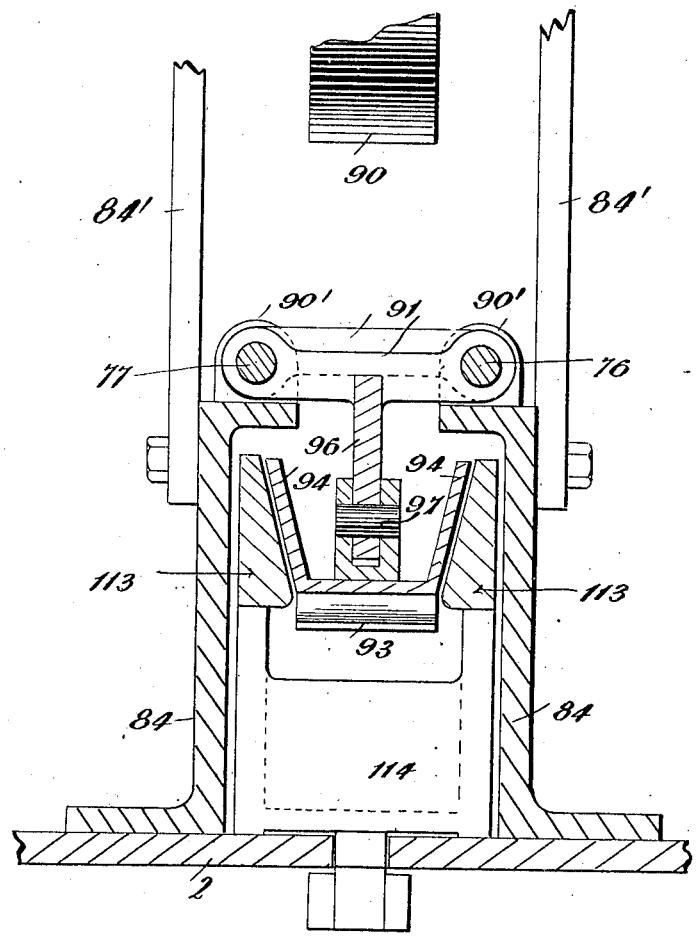
Figure 38:
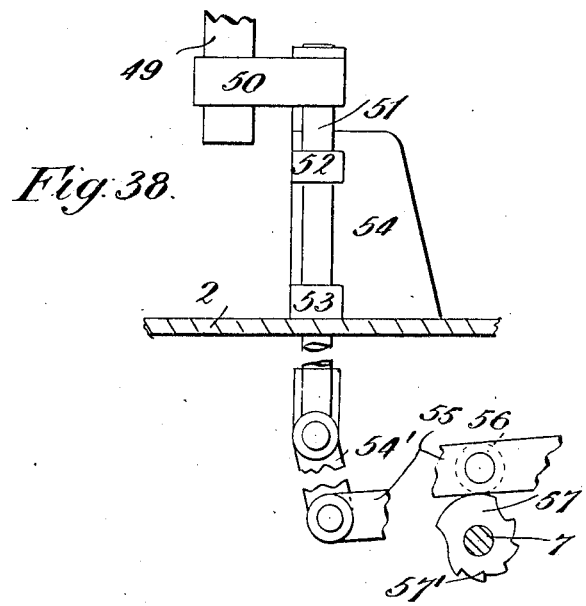
Figure 39:
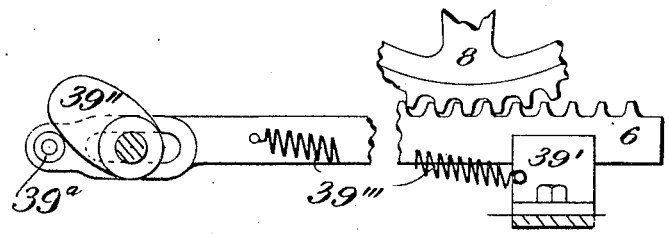

Figure 1 is a plan of the machine, with the card mechanism removed. Fig. 2. is a side elevation of Fig. 1. Fig. 3 is a longitudinal section to an enlarged scale of the gumming and folding mechanism for effecting the first folds of the end of the bag. Figs. 4. 5 and 6 are views showing various positions of the folders and the means for applying gum to the bag. Fig. 7 is a plan to an enlarged scale of the receiver employed when the packing machine is used in conjunction with a bag forming machine. Fig. 8 is a front end elevation of the horizontal reciprocatory slide carrying the plates supporting the sides of the packet during the folding and ramming operations. Fig. 9 is a plan of the parts illustrated in Fig. 8. Fig. 10 is a sectional plan of the means for effecting the final folding and closing of the bag. Fig. 11 is a sectional elevation of the above. Fig. 12 is a similar view to that shown in Fig. 11 with the folders out of action. Figs. 13 and 14 are respectively a front elevation and plan of one of the folders. Fig. 15 is a side elevation showing the first folders and the means for effecting the removal of the filled packet from the pocket wheel. Figs. 16 and 17 are respectively an end elevation and a plan of the folders for the second fold, and Figs. 18 and 19 are respectively an end elevation and a plan of the folders for effecting the first folding operation and applying gum to the second flap prior to its being folded down upon the first. Fig. 20 is a sectional view of an arrangement whereby the height of packets may be adjusted so that they do not project too far beyond the mouth of the pockets in the pocket wheel. Fig. 21 is a plan of Fig. 20. Figs. 22 to 29 illustrate to a reduced scale various levers and cams for effecting the movements of various parts of the machine. Fig. 30 is a side elevation of an alternative means for ejecting the bag from the device into which it is thrust by the ejector of the bag forming machine. Fig. 31 is a plan of the above. Fig. 32 is a side elevation of the operating cam and rod for the device shown in Figs. 30 and 31. Fig. 33 illustrates to a reduced scale means for raising the filled packet in the pocket wheel so that it may be thrust into a delivery chute. Fig. 34 is an elevational view of the mechanism for placing a card in the bag prior to the filling thereof. Fig. 35 is a plan of the above mechanism. Fig. 36 is a section on line A—A Fig. 34. Fig. 37 is a vertical section through the pivot of the folding device shown upon the left of Fig. 3 looking toward the left. Fig. 38 is a side elevation showing the means for effecting the vibratory movement of the funnel; and Fig. 39 is a side elevation showing the operative means for the disk carrying the pockets for the packet.

Referring to the appended drawings, 1 indicates generally the frame of the machine supporting a table 2 upon which are mounted the various devices for effecting the operations for filling and closing the bags.

Mounted upon the upper end of a vertical spindle 3 is a horizontally disposed wheel or disk 4 provided with a number of open chambers or pockets 5 closed at their lower ends by the table 2, with which the said ends are in close proximity. The spindle 3 receives its motion from a toothed rod 6 Figs. 2 and 39, carried at its outer end in a suitable guide 39′ and at its inner end straddling the shaft 7 from which it receives motion through a cam 39″ secured to the said shaft and upon which bears a roller 39ᵃ upon the rod. A spring 39‴ is employed to keep the roller always bearing upon the cam.

Actuated by the toothed rod 6 is a pinion 8 loosely mounted upon a shaft 9 Fig. 2, carried in the brackets 10 secured to the transverse bar 11 of the supporting frame of the machine. The pinion 8 carries a pawl 12 engaging a ratchet wheel 13 secured to shaft 9 so that the motion of the pinion 8 in one direction is transmitted to the shaft and to a worm 14 secured to the shaft and operating a worm wheel 15 upon the vertical spindle 3. The arrangement is such that at each revolution of shaft 7 the pocket wheel makes $\tfrac{1}{12}$th. of a revolution.

The shaft 7 is driven from the main shaft 17 through the pinions 17¹ and 18 secured respectively to the main shaft 17 and countershaft 7. Brackets such as 19, 20 are provided upon each side of the frame of the machine for the aforesaid shafts, and suitable driving pulleys not shown in the drawings, are provided upon the shaft 17.

The bags may either be placed by hand in the chambers of the pocket wheel or where the packing machine is designed to act in conjunction with a suitable bag making machine a device is provided into which the bags may be thrust by the ejector of the said bag making machine. Further, in some cases it may be desired to insert a card into the bag prior to or after filling the same, or cards may be inserted both before and after the bag receives its contents. As, however, the card or cards would not in all cases be required, in the general view the machine is shown with the mechanism for introducing the said cards omitted.

The packing machine is in the present instance, shown as provided with a device to receive the bags from a bag making machine. The aforesaid device comprises a rectangular box like frame 21, Figs. 1, 2 and 7, which frame is secured to the end of a spindle 22 mounted upon the end of an arm 23 secured at its opposite end to the upper extremity of a vertical spindle 24. The arm 23 is adapted to oscillate toward and from the pocket wheel about its pivotal axis, that is the axis of the spindle 24. A bracket 25 secured to the table 2 supports the spindle 24 at its upper end while for the lower end of the said spindle a footstep bearing 26 is provided upon the lower side member of the frame of the machine. The spindle 24 has secured to it at its lower end a toothed segment 27, Fig. 2, with which engage the teeth 28 upon the face of a horizontally disposed rod 29. The rod 29 at its outer end is supported in a guide 30 and at its other end straddles the shaft 7 and is provided with a roller 31 designed to bear upon the face of an operating cam 32 Fig. 22. A spring 33 shown in dotted lines in Fig. 22 keeps the roller always in contact with the cam, one end of said spring being secured to the guide 30 for the toothed rod 29 while the other end is attached to the rod itself. The spindle 22 aforesaid has secured to it at its opposite end to that carrying the frame 21, a short crank arm 34 to the outer end of which crank arm is pivotally attached by means of the pin 35 one end of a rod 36 the opposite end of the said rod being pivotally connected to the slotted head 37 mounted for oscillation upon the pin 38. A projection 39, secured to or cast integrally upon the upper end of the bracket 25, supports the pin 38 aforesaid. The position of the pivotal axes of the arm 23 and head 37, that is in the present illustration the centers of the spindle 24 and the pin 38, is such that while the link 36, connected through the crank arm 34 with the arm 23, rotates therewith at the same time the circle described by the outer end of the rod 36 is eccentric to that described by the arm 23 and consequently, assuming the receiver to be in the position shown in Fig. 7 the link 36 upon the angular movement of the spindle 24 will rock the arm 34 and the spindle 22 to which it is connected, bringing the receiver into a vertical position above one of the pockets 5 as shown in Fig. 1. The receiver 21 in Fig. 7 is in a horizontal position such that the bag when thrust off from the former of the bag making machine will be inserted in the said receiver, the open end of the bag being at that end of the receiver designed to be uppermost when the said receiver is turned into the vertical position upon the horizontal movement of the arm 23.

The mechanism for effecting the removal of the bag from the receiver 21 and its introduction into one of the pockets 5 may comprise a weight such as 40 secured to the end of a chain or cord 41 passing over guide pulleys 42, 43 upon a bracket 44 secured to table 2. The chain at its lower end is attached to the end of a weighted rod 45 operated by a cam 46 upon shaft 7 Figs. 2 and 23 and against which bears the roller 47 upon rod 45, the said rod being pivotally supported by a bracket 48 upon the frame of the machine. The mechanism is so arranged that upon the pocket wheel coming to rest and the bag receiver being brought into its vertical position over the chamber in said wheel, the weight descends and carries the bag with it into the said wheel. The weight is then raised clear of the receiver.

The bag, after being placed in the pocket wheel is carried forward to receive its contents of some commodity, as for instance tea or the like which is weighed and delivered by suitable mechanism not forming part of the present invention. The tea or the like being delivered from the weighing machine falls into a funnel 49, the lower end of which normally occupies a position above the mouth of the bag, but which, when the bag comes into position, is caused to be lowered and enter the mouth of the said bag so that the proper delivery of the tea or the like is insured.

In order that the necessary vertical movement of the funnel may be effected, the said funnel is mounted upon the end of an arm 50 secured to the upper end of a vertical rod 51 carried in guides 52, 53, Figs. 1, 2, 30, 31 secured to the bracket 54 upon table 2. The rod 51 is jointed to a rod 54¹ connected at its lower end to the outer end of a lever 55 carrying a roller 56 bearing upon a cam 57 secured to shaft 7 Figs. 2 and 24. The lever 55 is pivotally supported at its opposite end by a bracket 58 secured to the lower end member of the frame of the machine. The bag when in position to be filled, is supported upon a plate 59 of rectangular outline and of dimensions somewhat less than the area of the chambers on the pocket wheel. The upper surface of the plate 59 is normally flush with the upper surface of the table 2 and in order to assist the filling of the bag a vibratory movement is imparted to the plate shaking the bag and causing the contents to be shaken down therein, so that they are more or less level and so permit the proper folding of the ends of the bag. The vibration of the plate 59 is effected by means of the toothed disk 60 Figs. 2 and 25 upon the periphery of which bears the lever 61 under the influence of the spring 62. The lever is carried by an extension of the bracket 63 secured to the underside of table 2 and at its opposite end is provided with a head 64 designed to strike the lower end of the rod 65, to the upper end of which plate 59 is secured and for which plate an opening is formed in table 2. The rod 65 is supported in guides 66 formed upon the bracket 63 before referred to. If desired a similar vibratory movement may be imparted to the funnel 49 to prevent the tea or the like clogging or hanging therein. This may be effected by providing the smaller diameter of the cam 57 with projections 57¹ as shown in Fig. 38 so that during the passage of the roller 56 thereover a vibratory movement will be imparted to the funnel which will shake the tea therein and prevent it clogging or hanging in the funnel and so insure its discharge into the packet. The bag after receiving its contents is carried forward by the pocket wheel and is next placed in a position for two of the sides to be folded inwards the contents of the bag being first rammed or pressed down. During the first folding operation gum is applied to the second fold so that the first folds are secured together, the final folds being secured if desired, by means of a gummed label placed thereon by hand.

The mechanism for effecting the above operations comprises a block 67 secured to the end of a rod 68 carried in guides upon the arms 69, 70 forming part of the bracket 71, which bracket is bolted or otherwise secured to the table 2. The bracket 71 is bifurcated at its lower end so that it straddles the folding mechanism as shown in Fig. 3. The block 67 has secured to it two small brackets 72 designed to carry the ends of the spindle of a gum roller 73, and which roller receives gum from a roller 74 rotating in a gum reservoir 75 carried upon brackets secured to the table 2. The roller 74 just referred to is rotated by means of a lever pivotally secured to one of the rods 76, 77 carrying the folders to be presently more fully described.

78 indicates a ratchet wheel upon the spindle of the gum roller 74 Figs. 1 and 3 and with which wheel engages a pawl upon the rocking lever 79 freely mounted upon the spindle of the aforesaid gum roller 74, and to the lower end of which lever is secured the end of the rod 80 connected at its opposite end to a boss 81 upon the rod 76. It will be obvious that upon the reciprocation of the rod 76, the roller 74 will be caused to rotate and gum be transferred from the container 75 to the roller 73. The vertical reciprocation of the block 67, the dimensions of which are such as to permit it to readily enter the mouth of the filled bag, is effected by means of the bars 82, 82¹ secured to the spindle 83 supported by extensions 84¹ secured to the brackets 84 supporting the folders. The upper end of lever 82 is connected by means of links such as 85 with a block 86 secured to the upper end of rod 68 and movement is imparted to the lever by means of the rod 87, at its lower end straddling shaft 7 and carrying a roller 88 bearing upon the edge of the cam 89, see Fig. 28. A counterweight 90 serves to keep the roller 88 in contact with the cam. The horizontal rods 76, 77 before referred to are supported in guides such as 90¹ formed integral with the upper surface of the brackets 84. The rods are connected by means of the transverse bars 91, 92 each bar being provided with a depending foot like extension 96 to which are pivotally secured the folders illustrated in Figs. 3 to 6 and 15 to 19. The folders comprise shoes 93 having outwardly inclining sides 94 and in which are secured in any convenient manner the U shaped castings 95 between the vertical walls of which passes the extension 96 forming part of the transverse connecting bars 91, 92 aforesaid. A pin 97 passes through the walls of the casting 95 and the extensions 96. Each folder is maintained in its normal position by means of springs 98 connected at one end to a convenient portion of the folder and at the other to a pin upon the extension 96. The inclined lower portion 99 of the extension coming into contact with the upper surface of the base of part 95 limits the movement of the folders under the action of springs 98.

It will be seen on reference to the drawings, that the folder upon the right hand side in Figs. 3 and 15, is provided with a piece of rubber or other suitable substance 100 clamped by means of the plate 101 to the transverse plate 102 formed integral with the shoe. The casting 95 is cut away for the passage of the plate 102. When in its normal position the rubber projects into the path of the gum roller 73 so that upon the descent of the block 67 the roller thereon comes into contact with the rubber or the like 100 and applies gum thereto substantially as shown in Fig. 4. Upon the withdrawal of the block 67, the purpose of which as already described being to press the contents of the bag down to a level approximately even with the top of the chamber in the pocket wheel, the right hand folder is advanced and in its forward passage encounters the upstanding side of the end of the bag. The folder continuing its movement folds the side down and eventually the tail end of said folder comes into contact with a roller 103 arranged transversely of and in the path of the folder, so that the folder is tripped against the action of its spring and brought into a horizontal position as shown in Fig. 5, pressing the folded portion down upon the top of the contents of the bag. At the same time the rubber 100, to which as above described, gum has been applied, comes into contact with the opposite upstanding portion of the bag and applies gum thereto. The roller 103 before referred to is supported by a spindle 104 carried by arms 105 secured to the inside of the brackets 84. Upon the withdrawal of the right hand folder the left hand folder advances and folds the opposite side of the bag and during its forward movement is tripped by means of a bar 106 arranged transversely of its path, pressing the folded portion down upon the first fold to which it will adhere by reason of the gum applied to its inner surface. Upon the withdrawal of the second folder the parts are returned to their original positions as shown in Fig. 3. The reciprocation of the folders is effected by means of a cam 107 secured to shaft 7, Fig. 27 and with the groove in which engages a roller 108 secured to the lever 109 pivotally supported upon the bracket 110 secured to the transverse bar 111 upon the end members of the frame, see Fig. 2. The lever 109 at its upper end is connected by means of links 112 with a projection upon the outermost bar $112^1$ connecting the folder rods.

During the folding operations above described the sides of the bag are prevented from bulging or becoming otherwise damaged by means of the wedge shaped plates 113, the inclination of which is approximately that of the sides of the shoes 93. The plates are carried by the extensions 114 upon the end of a slide 115 which slide is arranged to reciprocate horizontally between the brackets 84. The dimensions of the parts are such that when the shoes are in position between the plates 113 there is just sufficient clearance between them to accommodate the upstanding sides of the bag. To prevent damage to the bag any sharp edges thereon which might come into contact with the bag are rounded off. The inclination of the plates 113 and of the sides of the shoes causes the sides of the bag not being operated upon to be bent or turned out of the way and at the same time does not injure them so that they cannot afterwards be properly folded. By this means the final folding may be perfectly accomplished and the end of the packet present a neat appearance. The movement of the slide 115 is effected by means of a cam 116 Fig. 26, secured to shaft 7 and with the groove of which engages a roller 117 secured to the lever 118 pivotally supported by the bracket 119 secured to the transverse bar 111 aforesaid. Upon the withdrawal of the folders and side plates the pocket wheel is again rotated and comes to rest in a position intermediate of the two sets of folding devices, the next movement bringing it into a position ready for the final folding operations. The folders for effecting the above operation comprise a pair of plates such as $119^1$ supported upon pins 120 passing through lugs 121 formed upon the angle plate or bracket 122 secured to the front of the bracket 123 bolted or otherwise secured to the table 2, see Figs. 1 and 10 to 14 of the accompanying drawings. The ends of the pins are provided with portions 124 bent at a right angle to the body thereof and to these are connected the lower ends of springs 125, the upper ends of said springs being secured to the turned over portion 126 of the pin 127. Under the action of the springs the plates $119^1$ have a tendency to assume a horizontal position as shown in Figs. 10 and 12. The angle plate 122 is perforated for the passage of the presser block 128 secured to the vertical rod 129 for which suitable guides are formed upon the bracket 123. Also secured to the rod 129 is a forked plate 130 straddling the block 128 as shown in Figs. 11 and 12. The vertical portions of the plate are tapered, being thickest at their outer ends. The plate 130 operates the folders upon the downward movement of rod 129, the vertical portions of the plate 130 coming into contact with the plates $119^1$ when in their horizontal positions, causing them to swing inwards against the action of the springs 125 when they come into contact with the upstanding sides of the bag and fold same inwards. The plates $119^1$ are channeled at 131 and at the upper end of said channels are provided with projecting plates of wedge shaped longitudinal section 132. The channels and the plates are clearly shown in Figs. 13 and 14. The purpose of the projections is to cause the plates to first swing inwards as indicated by the dotted lines in Fig. 11 by the lower and thicker portions of the vertical members of forked plate 130 coming into contact with the projections 132 upon the said plates. Upon the ends of plate 130 clearing the projections 132 the folders under the action of their springs, open outwards, leaving a clear passage between them for the presser block 128 which block comes into contact with and presses the final folds of the bag remaining in contact therewith during the period of rest of the pocket wheel.

Figure 29:
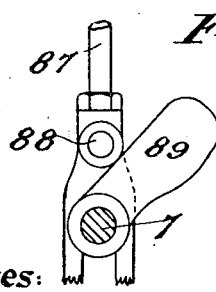

The operation of the rod 129 is effected by means of a cam such as 133 secured to shaft 7 upon which bears a roller 134 upon a rod 134¹ which at its lower end straddles the said shaft 7, as shown in Fig. 29. The upper end of the rod is connected to a lever 135 supported by the bracket 136 secured to the face of the table 2, the opposite end of the lever being connected by means of the links 137 to the block 138 upon rod 129. A spring 138¹ shown in Fig. 1 keeps the roller 134 always in contact with the cam.

The further successive movements of the pocket wheel eventually brings the packet into line with mouth of the chute 141 into which it is delivered. The packet when the wheel is in the position just referred to, rests upon a rectangular plate 140 for which an opening is formed in the table 2. The dimensions of the plate are such as to permit it to freely enter the chamber in the pocket wheel, in order to raise the packet until the bottom thereof is on a level with the bottom of the discharge chute 141, Fig. 1 and into which chute the packets are thrust by the plate 142 secured to the end of the rod 143. The rod 143 is carried by the outer connecting bar of the rods 76, 77 and reciprocates with the said bars. The movement of the plate 140 is effected by means of the cam 144 secured to shaft 7. and which cam operates a lever 145 pivoted upon the main shaft 17. The outer end of lever 145 is connected to the lower end of a rod 146 to the upper end of which the plate 140 is secured as shown in Fig. 33.

It is found in practice that the height of the packet will vary in accordance with the material which is being packed. Thus for example, small leaved tea can be compressed into smaller dimensions than tea having a coarse leaf. Under these latter circumstances, it is found that the height of the packet after the compression of its contents is greater than in the first case and consequently in order that the folding may be properly performed that the various folding devices need adjustment. In order to avoid the aforesaid adjustment of the folders I employ the arrangement shown in Figs. 20 and 21 in which 147 indicates a plate secured beneath an opening 148 formed in the table 2, such opening being of circular outline and extending in the present instance for a distance equal to one fourth the circumference of the pocket wheel and equal in width to the internal width of the chambers therein. The opening is shown in dotted lines in Fig. 21. The plate 147 is connected by means of studs or bolts 149 to the underside of table 2 and is provided with wedge shaped projections 150 upon its underside, such projections engaging the inclined faces of the projections 151 upon the upper face of plate 152. The plate 152 is secured to the table by the bolts 149 aforesaid, which are provided with nuts 153 for this purpose. Distance pieces or lugs 154 upon the plate 152 serve to keep it in its proper position with regard to the plate 147.

The plate 152 is slotted for the passage of the bolts 149, springs 156 being interposed between the two plates 147 and 152 as shown in Fig. 20. To adjust the height of the packet, plate 147 is raised or lowered by moving the plate 152 by means of the set screws 156¹ passing through screwed bosses 157 formed upon the underside of the table 2. The inner end of each screw 156¹ passes through the distance piece upon the plate 147 and is provided with a collar and lock nuts as shown in Fig. 20. By moving plate 152 to the right or left the upper plate 147 is caused to be raised or lowered as will be readily understood on referring to the drawings. The packets are pushed down upon the plate 147 by the rammer acting in conjunction with the gum distributing roller and are raised until upon a level with the upper surface of table 2, upon reaching the end of the opening 148 by the plate 158 operated from the main shaft by means of a suitable cam and lever as in the case of the other similar plates to which reference has previously been made.

Figs. 30 and 31 illustrate an alternative form of apparatus for effecting the removal of the bags from the receiver and inserting them in the pocket wheel. Secured to or formed integral with the upper end of bracket 54 carrying the funnel 49 is an extension 159 having at its upper end a horizontal portion 160 provided with two bosses 161, 162 perforated for the passage of rods 163, 164. The rods 163, 164 are connected together at or near their upper ends by means of the bar 165, the rod 163 being so disposed that it is normally above and coincident with the vertical center line of the bag when it is in a position to be placed in the pocket wheel. The rod 164 is at its lower end provided with teeth designed to engage a sprocket wheel 167 secured to one end of a spindle 168 supported at one end by the bracket 54 and at the other by means of a bracket 169 secured to table 2. At its opposite end the spindle 168 is provided with a pinion 171 engaging a vertical reciprocating rod 172 having teeth upon one face and operated from the shaft 7 by means of a cam such as 173 with the groove of which engages the roller 174 upon the lower end of rod 172 aforesaid. Upon the reciprocation of the rod 172 the rod 163 comes into contact with the bottom of the empty bag in the receiving device and thrusts it into the chamber of the pocket wheel.

As aforesaid, cards may be inserted in the bag prior to or after it has received its contents or both before and after this operation.

In Figs. 34, 35 and 36 is illustrated mechanism for effecting the introduction of a card into the bag prior to filling the same.

The means for performing the above operation in the case where the card is to be inserted prior to the filling of the bag comprises a vertically disposed tube 175 which is substituted for the rod 163 shown in Figs. 30 and 31 which rod passes through the boss 161 upon arm 160 carried by bracket 159. In the present instance, the tube is provided at its lower end with a pair of plates 176, 177 between which are clamped the heads of spikes or pins 178 which pins project through apertures formed in a plate 179 which plate is secured to the lower end of the rod 180 contained and working within the tube 175 aforesaid. The tube just referred to is secured to the bar 165, the opposite end of which bar is connected to the vertically reciprocating rod 164. The upper end of rod 180 is pivotally secured to the end of the lever 181 carried by a column 182 secured to the upper surface of the bar 165. The opposite end of the lever 181 is under the influence of a spring 183, the action of which causes the plate 179 upon the rod 180 to be normally pressed against the plate 177 so that the ends of the pins project below the surface of the said plate 179. The separation of the plates is effected by means of the stud 184 which is adjustably secured to the arm 160 of bracket 159 and which, upon the downward limit of motion of the plate 165 being reached passes through the aperture 185 and coming into contact with the underside of lever 181 causes the outer end thereof to be depressed against the action of its spring 183. As will be readily understood, the downward movement of plate 179 will push the card, which as will be presently described, has been picked up by the pins, off the said pins.

Cast integral with or secured to the bracket 159 is an arm 186 to which is secured by bolts 187 a plate 188. The plate 188 is slotted for the passage of rack 189, Fig. 36, which is secured to the underside of a slide 190 running in guides 191, 192. The rack 189 is engaged by a toothed sector 193 shown in dotted lines in Fig. 34 which sector is secured to the extended upper end of the vertical spindle 24 carrying the receiver for the bag. The slide upon the rotation of the spindle 24 is thrust forward and is brought into a position beneath the plate 179 carrying with it a card from the magazine 193. The plate is then caused to descend and the pins enter the card which upon the upward movement of the plate is lifted. The necessary movement is obtained by the addition of a suitable cam surface to the cam operating the vertical rack 178, shown clearly in Figs. 30 and 31. Upon the upward movement of the plate 179, the slide is withdrawn from the path of the plate, which upon the receiver 21 coming into position thereunder, descends, forcing the bag into a pocket of wheel 4. The card is released as aforesaid when the rod 164 approaches its point of lowest movement. A similar arrangement to that just described may be employed in conjunction with the block 67 so that two cards may be introduced into the packet one before filling and one after the bag has been filled, and prior to closing the end thereof.

The full operation of the machine can be clearly ascertained from the foregoing description, it being understood that the various necessary operations for the filling and closing of the bag are effected successively during the periods of rest of the pocket wheel.

Having now particularly described and ascertained the nature of my said invention, and in what manner the same is to be performed, I declare that what I claim is:—

1. In a packing machine, the combination of a horizontally disposed rotatable wheel provided with a series of bag pockets, means for intermittently rotating the wheel, means for placing bags in the pockets of the wheel, means for filling the bags in the pockets, means for shaking the bags during the filling thereof, means for pressing down the contents of the bags, means for effecting the first folding operation of the bags, gumming means carried by said folding means, means for preventing distortion of the sides of the bag opposite that being folded during such folding, folding and pressing means for completing the folding and closing of the bag, means for removing the filled bag from the pocket wheel, and means for discharging the bag from the machine.

2. In a packing machine, the combination with a table, of a wheel rotatably mounted upon the table and provided with a series of open ended pockets for receiving bags to be filled, means for filling the bags, means for rotating the wheel step by step for bringing the pockets serially adjacent to the filling means, said table adjacent to the filling means being provided with an opening, a support in said opening for the bag being filled, and means for vibrating said support during the filling operation.

3. In a packing machine, the combination with a table, of a wheel rotatably mounted upon the table and provided with a series of open ended pockets for receiving bags to be filled, means for filling the bags, means for rotating the wheel step by step for bringing the pockets serially adjacent to the filling means, said table adjacent to the filling means being provided with an opening, support in said opening for the bag being filled, and means for vibrating said support during the filling operation, and comprising a support, a lever connected to said support, and a toothed disk engaging said lever.

4. In a packing machine, the combination with bag holding means, of bag filling means, and means for closing the bags and comprising a flaring support for the sides of the portion of the bag to be folded, a reciprocatory shoe for engaging one side of the bag and effecting the first fold, means for reciprocating the shoe, means for tipping the shoe for pressing down the fold effected thereby, a reciprocatory shoe for effecting a second fold, means for reciprocating said shoe, means for tipping the shoe for pressing down the second fold, and means for pressing down the sides after the second fold.

5. In a packing machine, the combination with bag holding means, of bag filling means, and means for closing the bags and comprising a flaring support for the sides of the portion of the bag to be folded, a reciprocatory shoe for engaging one side of the bag and effecting the first fold, means for reciprocating the shoe, means for tipping the shoe for pressing down the fold effected thereby, a reciprocatory shoe for effecting a second fold, means for reciprocating said shoe, means for tipping the shoe for pressing down the second fold, means for pressing down the sides after the second fold and comprising a pair of pivoted plates, springs for normally spreading these plates apart, means for reciprocating the plates, and means for swinging the plates toward each other.

6. In a bag packing machine, the combination with a receiver for the bag, of a vertically reciprocating member for expelling the bag therefrom, a rod contained within such reciprocating member, a plate fast with said member and carrying pins, a plate reciprocatory on said member and having perforations through which said pins project, a magazine for carrying cards, means for moving the cards from the magazine, means for bringing said pins into engagement with said cards, and means for reciprocating said reciprocatory plate for removing the card from the pins.

7. In a packing machine, the combination with a horizontally disposed wheel having a series of bag holding pockets, of means for filling the bags therein, means for removing the filled bags and comprising a vertical reciprocating plate movable upwardly through the pockets, a horizontally disposed member for pushing the packet when raised into a discharge chute, and said discharge chute.

8. In a packing machine, the combination with a table, of an open ended pocket for holding a bag, means for shifting said pocket about said table, means for filling the bag while in one position, means for folding and closing the bag while in another position, the table being provided with an opening at said latter position, a plate filling said opening and affording a rest for the bag while being folded and closed, said plate having slanting faces upon its lower side, pins for guiding said plate, a plate having slanting faces coöperating with the slanting faces upon said former plate and having engagement with the lower side of the table, springs interposed between said plates, and means for shifting the latter plate for effecting the adjustment of the former plate.

9. In a bag filling machine, the combination with means for holding the bags to be filled, of means for receiving bags and delivering these to said holding means and comprising a bag receiving frame, a pivoted arm adapted to swing toward and from said bag holding means, said frame having a spindle mounted in said arm transversely of the pivotal axis thereof, a crank-arm fast on said spindle, a head pivotally mounted for oscillation upon an axis transverse to the pivotal axis of said arm, a link connecting said crank-arm and head, and means for oscillating said arm.

10. In a bag filling machine, the combination with upwardly opening pockets for holding the bags to be filled, of means for receiving bags and delivering these to said holding means and comprising a bag receiving frame, a pivoted arm adapted to swing toward and from said pockets upon a horizontal plane, said frame having a spindle mounted in said arm transversely of the pivotal axis thereof, a crank arm fast on said spindle, a head pivotally mounted for oscillation upon an axis transverse to the pivotal axis of said arm, a link connecting said crank arm and head, means for moving said pocket wheel, and means for oscillating said arm for effecting the oscillation of said frame upon said spindle.

EDWARD COLSTON LOVELL.

Witnesses:
 JOHN H. PARK,
 E. H. HARBERD.